United States Patent [19]

Schmall

[11] 4,333,052

[45] Jun. 1, 1982

[54] RESONANT CIRCUIT WITH TWO PARTIAL INDUCTANCES

[75] Inventor: Karl-Heinz Schmall, Baden-Baden, Fed. Rep. of Germany

[73] Assignee: Messer Griesheim GmbH, Frankfurt am Main, Fed. Rep. of Germany

[21] Appl. No.: 911,282

[22] Filed: May 31, 1978

[30] Foreign Application Priority Data

Jun. 14, 1977 [DE] Fed. Rep. of Germany ....... 2726648

[51] Int. Cl.[3] ........................ G01B 7/14; G01R 33/12

[52] U.S. Cl. .................................... 324/208; 324/236; 266/76; 219/124.34

[58] Field of Search .............. 148/9; 266/76; 324/236, 324/207, 208; 318/576, 653; 219/124.34, 124.02

[56] References Cited

U.S. PATENT DOCUMENTS 2,747,152 5/1956 Greene .................................. 266/76
3,217,204 11/1965 Nance .................................. 266/76
3,329,906 7/1967 Bringert .............................. 324/236
3,579,068 5/1971 Tschang ......................... 219/124.02

FOREIGN PATENT DOCUMENTS 127903 9/1959 U.S.S.R. ................................ 266/76

*Primary Examiner*—Gerard R. Strecker
*Assistant Examiner*—Walter E. Snow
*Attorney, Agent, or Firm*—Connolly and Hutz

[57] ABSTRACT

A control circuit for measuring the distance between a workpiece and an electrode which is formed as inductance and is part of a resonant circuit as a frequency-determining element whereby the frequency variations of the resonant circuit for producing voltage and/or current changes which are proportional to a distance are connected to a measuring circuit and includes at least two partial inductances in the resonant circuit with one inductance being represented by the electrode and the other being a stationary resonant circuit arranged at a distance from the electrode and in the immediate influence sphere of the workpiece.

6 Claims, 3 Drawing Figures

RESONANT CIRCUIT WITH TWO PARTIAL INDUCTANCES

BACKGROUND OF THE INVENTION

The invention relates to a control circuit for measuring the distance between a workpiece and an electrode which is formed as inductance and is part of a resonant circuit as a frequency-determining element whereby the frequency variations of the resonant circuit for producing voltage and/or current changes which are proportional to a distance are connected to a measuring circuit.

Devices have been long known which measure by capacitive means the distance between a tool and a workpiece and as a result make it possible to keep this distance constant via a control device. For example, electrodes are used in flame cutting machines which perform cutting procedures with acetylene gas which are attached to the tool and are arranged opposite the plate to be worked on in such a way that between the electrode and plate a distance remains which is regulated at a certain capacitance. Measuring the capacitance takes plate here electronically; a signal is transmitted from the output of the measuring instrument to the control device of the drive motor which automatically keeps the distance constant between workpiece and tool.

Such devices have also stood the test thus far in the use of plasma cutting torches. However, recently plasma cutting torches are used which operate with an additional water jacket which encloses the plasma arc like a jacket and, therefore, concentrates vapors and other polluting effects on the cutting procedure itself. The water jacket in such instruments is produced with a diameter of about 50 mm immediately above the arc electrode, concentric to the plasma arc, and strikes the workpiece at a right angle so that it consistently encloses the entire cutting area. When the water strikes, a water puddle several mm thick is formed on the workpiece, for example, a steel plate. This water is conductive and might be incorrectly evaluated by a capacitive electrode as the upper surface of the workpiece. As a result, the signal might be transmitted by the output of a capacitive distance measuring instrument, which might result in too great a distance between torch and workpiece surface. Capacitive concentric electrodes are, therefore, rejected for scanning in water plasma cutting instruments.

It was also already proposed to measure the distance between torch and workpiece inductively by using several coils arranged around the torch. Each of these coils is wired here as a frequency-determining element in a resonant circuit which is varied in frequency by an inductivity change of the coil as a result of a change in distance to the tool so that from the frequency variation, appropriate measuring signals can be derived in an in itself known way. The evaluation of such frequency variations, for example, in discriminator circuits or band selectors has been known and in use for a long time and requires no further explanation here.

In addition to relatively high mechanical effort because of the arrangement of at least three or four coils spaced around the torch, the inductive measuring circuits described here have the significant disadvantage that the circuit inductances are fully exposed to the influence sphere of the workpiece and possible disturbance variables such as heat from the plasma beam and the influence of the cooling water and that the distances between these inductances must, therefore, be large as a result of which control accuracy is reduced. The use of inductances for measuring distances, especially in applications requiring accurate distance regulation such as plasma cutting torches was, therefore, thus far not possible.

SUMMARY OF THE INVENTION

The invention has as its object avoiding the known disadvantages and to especially provide, therefore, a control circuit for measuring the distance between a workpiece and an electrode, which supplies, by using inductive probes, reliable measuring results even when other disturbance variables occur and which can, moreover, be simply and economically produced.

Furthermore, an arrangement must be provided which is not sensitive in maintenance and operation to mechanical stress and permits, moreover, the incorporation of cut-out fuses which stop the tool feed or lift the tool when the total arrangement of electrode and tool, for example, torch, strikes an obstacle.

This object is particularly met according to the invention when the resonant circuit has at least two partial inductances, one of which is formed by the electrode and the other is a stationary resonant circuit coil, arranged at a distance from the electrode and in the immediate influence sphere of the workpiece. The result is obviously optimally and simply that interference capacitances affect only part of the resonant circuit inductance so that the influence on the resonant circuit is essentially reduced by the above mentioned interference capacitances. Furthermore, the advantage is obtained that the electrode must have a low number of turns only and can, therefore, be produced mechanically stable from few turns of an appropriately thick conductor. This has been especially demonstrated with cutting torches, when the electrode consists of a ring-shaped bent conductor which concentrically encloses the torch beam approximately 360°. Especially good results have been obtained in practical tests with a ring electrode with a diameter of about 60 mm and a conductor diameter of 5 mm as well as a lead wire of about 150 mm to 200 mm between the stationary coil and the electrode. Optimal results can be obtained here when the inductance of the stationary coil is greater than the inductance of the electrode. The ratio should here preferably be greater than 1:30. This produces the effect that the influence of interference capacitances is practically eliminated, since they only affect the entire circuit with the transformation factor which is a function of the ratio of the inductances of electrode and stationary coil.

Even interference capacitances which could thus far not be compensated, for example, the influence of the water jacket of the above described plasma welding equipment can now be suppressed.

As a result of producing the electrode from conductors with a large cross section, made possible and provided for according to the invention, an extremely high mechanical stability of the entire equipment is obviously attained which substantially improves the operating characteristics, especially under difficult conditions. This also makes it possible to provide the electrode with a switch-off device for switching off the cutting torch drive and/or to activate a lifting device for raising the cutting torch, since the electrode can readily absorb mechanical stresses.

Switching off can be realized especially well when the electrode is laterally movable arranged and is connected with a switch in such a way that the switch is activated when the electrode moves when touching an obstacle and that in turn the switch is electrically connected to the switching off device in order to activate it. It is advantageous here that the electrode is surrounded with an insulating jacket to avoid influencing the resonant circuit.

Stopping the workpiece when it touches an obstacle can, however, also be profitably guaranteed by electronic switching off, when a capacitance diode is connected with the electrode, when an auxiliary voltage source is connected to electrode and capacitance diode for adjusting a capacitance value to be determined and when the workpiece is also connected to the auxiliary voltage source in such a way that the voltage at the capacitance diode and, therefore, its capacitance value is variable when the electrode touches the workpiece.

Irregular frequency variations in the resonant circuit can obviously be obtained with this system as a result of corresponding mistuning of the capacitance diode when touching an obstacle. These frequency variations can readily and in a known way be converted in electrical signals and utilized for releasing cut-off signals.

The invention provides a new control circuit which is from the most different viewpoints more dependable with respect to mechanical and electrical disturbing effects and presents completely new application possibilities for inductive distance measuring even under the most difficult conditions. The technical progress and inventive content of the object of the application are obviously guaranteed here by the new individual characteristics as well as by the combination and sub-combination of the characteristics which find application.

It is well known to the expert to use in the detail realization any structural elements to evaluate the inductance variations of the electrode. It is, for example, quite possible to use instead of an oscillator circuit another resonant circuit, the characteristic frequency of which leads in the measuring instrument to the formation of an output signal, proportional to the distance, at the output of this instrument.

An oscillator circuit must, therefore, not immediately and unconditionally be connnected to the inductances.

With the approach of the inductance to a workpiece surface e.g. steel, brass, copper, aluminum or other construction materials, an electromagnetic field is produced by the high frequency field in the induction loop, represented by the electrode, which produces eddy currents in the surface layers of the workpiece.

These eddy currents produce on their part out-of-phase magnetic fields with a stable frequency which reactively affect the inductance of the induction loop in a manner which produces a reduction of the measurable inductance during a closer approach to the workpiece.

If the induction loop in the measuring instrument is connected to an oscillator circuit, the oscillator frequency is increased as a result. The frequency variation of the oscillator circuit or in case of a passive resonant circuit, the variation of the resonance frequency in the measuring instrument, can be used with the known means which are also ready in use for capacitive scanning to form an output signal in the desired manner.

When the space between the induction loop and the workpiece increases, for example, as a result of the fact that with the movement of the torch over the workpiece (cutting procedure) the workpiece sags (not an obsolute flat upper surface of the workpiece) the influence of the rotating currents is reduced, the inductance of the induction loop increases. A signal is produced as a result in the measuring instrument which is connected to the induction loop, which corresponds to an increase in the distance and is used to turn the drive motor for the vertical adjustment of the torch in a direction which brings the torch close again to the workpiece until the nominal distance between torch and workpiece respectively between induction loop and workpiece has again been reached.

For reasons of safety and for recording defective operating conditions, additional auxiliary functions are, in general, perceived by the capacitive electrode in capacitive distance controls.

They are, for example, the emergency shut-off or the emission of a danger-announcing signal when the electrode makes direct contact with the surface of the workpiece or with a metallic conducting foreign object located on the workpiece.

It happens namely in practice that workpiece parts, tools, clamping devices or similar objects lie on the surface of the workpiece which must cause a switching off of the cutting procedure when it approaches. Measures are, therefore, provided in capacitive distance controls which bring about a switching-off at the moment of contact between electrode and upper surface of the workpiece or any foreign object located on it.

It is known to make this function work in such a way that contact with the electrode and consequently the short circuit of the capacitive measuring zone produces a drastic frequency variation of the measuring circuit whereby other resonant circuit capacitances become active within the measuring circuit and as a result, a switching function is introduced which can be brought about via a special resonant circuit which is adjusted to the frequency produced by the contact.

Such a contact mistuning is not readily possible in the present invention concept of inductive scanning.

The water namely, concentrically surrounding the plasma beam, also strikes the electrode or touches the electrode which is at a distance of about 5 to 8 mm from the workpiece upper surface and is, therefore, included in the water mass. An electrically conducting connection is, therefore, already established between electrode and workpiece, the conductivity of which depends heavily on the properties of the water used.

For this reason, the above described measures are taken according to the invention, which bring about the fact that transfer resistances above a certain limit do not affect the frequency of the resonant circuit in which the induction loop is located, whereas a direct contact between loop and workpiece brings about a drastic mistuning.

THE DRAWINGS

DETAILED DESCRIPTION

Figure 1:
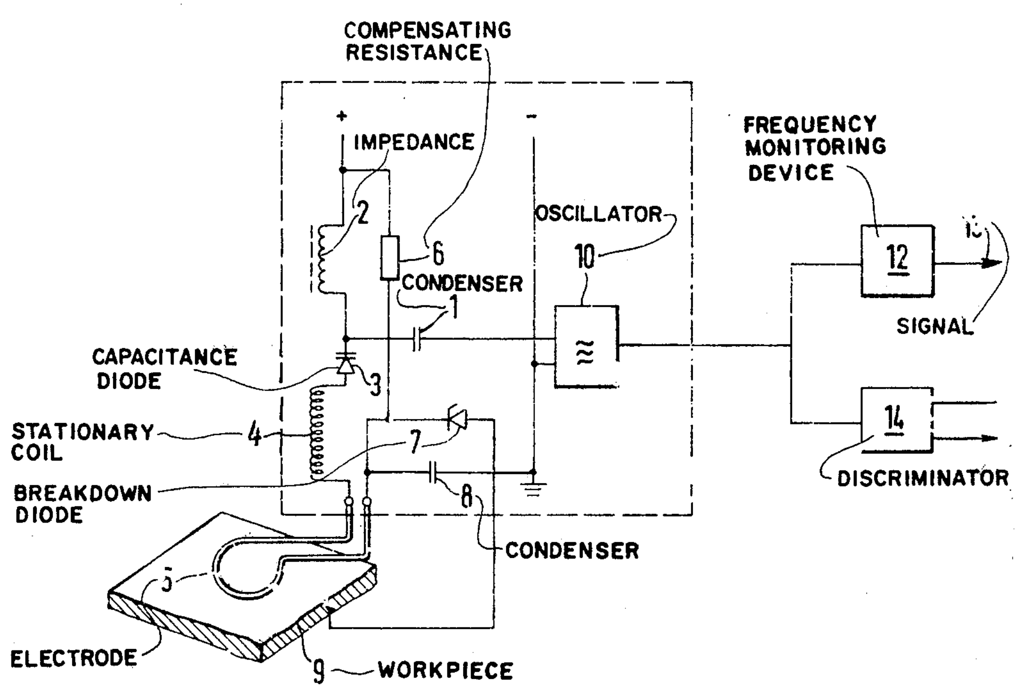
FIG. 1 is a schematic diagram of a control circuit in accordance with the invention.

The control circuit according to FIG. 1 has a series resonant circuit which consists of the inductances of an electrode or sensing element 5 and a stationary coil 4 as well as the capacitances of a condensor 1, of a condensor 8 and a capacitance diode 3. The resonant circuit formed by the above mentioned elements is connected to an oscillator 10 and determines in a known way its frequency. Instead of oscillator 10 another device can obviously also be used, which evaluates the characteristic frequency of the resonant circuit. Capacitance diode 3 receives a positive bias voltage via an impedance 2 while at the lower end, the inductance formed by electrode 5 also receives a positive voltage via a compensating resistance 6 and a break-down diode 7 in a potential which lies below the positive voltage at impedance 2. Electrode 5 has a diameter of about 60 mm whereby the loop-forming electrode 5 consists of a copper conductor with a diameter of 5 mm.

Coil 4 has an inductance of about 10 $\mu$H whereas the inductance of electrode 5 is determined by the distance from a workpiece 9. The inductance is at a distance of 6 mm about 0.2 $\mu$H and is reduced to 0.15 $\mu$H at a distance of 3 mm. The variation caused by this reduction in the characteristic frequency of the resonant circuit and consequently of oscillator 10 is evaluated in a discriminator 14 connected with the output of oscillator 10, and converted into a signal proportional to the distance and used in a known way for readjusting the electrode-to-workpiece distance, respectively, the tool-to-workpiece distance.

Capacitance diode 3 obviously assumes a certain capacitance value as a result of the voltage difference between its upper and its lower end, which codetermines the frequency of the resonant circuit.

As long as the resistance between workpiece 9 and electrode 5 does not fall below a certain transfer resistance 11 (not shown), for example, wetting with water, break-down diode 7 keeps via resistance 6 the voltage constant at the lower end of the inductances formed by electrode 5 and consequently at the lower end of capacitance-adjusting diode 3. The capacitance of capacitance diode 3 does not change as a result. Only the variation of the electrode inductance brought about by the change in distance between workpiece 9 and electrode 5 causes a frequency-changing influence in the entire resonant circuit.

However, as soon as workpiece 9 touches electrode 5, the voltage at break-down diode 7 is directly short circuited so that a capacitance-changing higher voltage adjusts itself at capacitance diode 3 which considerably changes the frequency of the circuit, for example in the embodiment example by a factor of 2.

This frequency change is evaluated in the connected frequency monitoring device 12 as signal 13 whereas the output frequency of oscillator 10 emits in normal operation the usual follow-up control signals for the drive of the torch via the connected discriminator 14.

A switching procedure is released in a further and simplified refinement of the present invention when touching the induction loop—regardless in which direction—which is introduced by mechanical changes in the position of the induction loop.

Figures 2, 3:
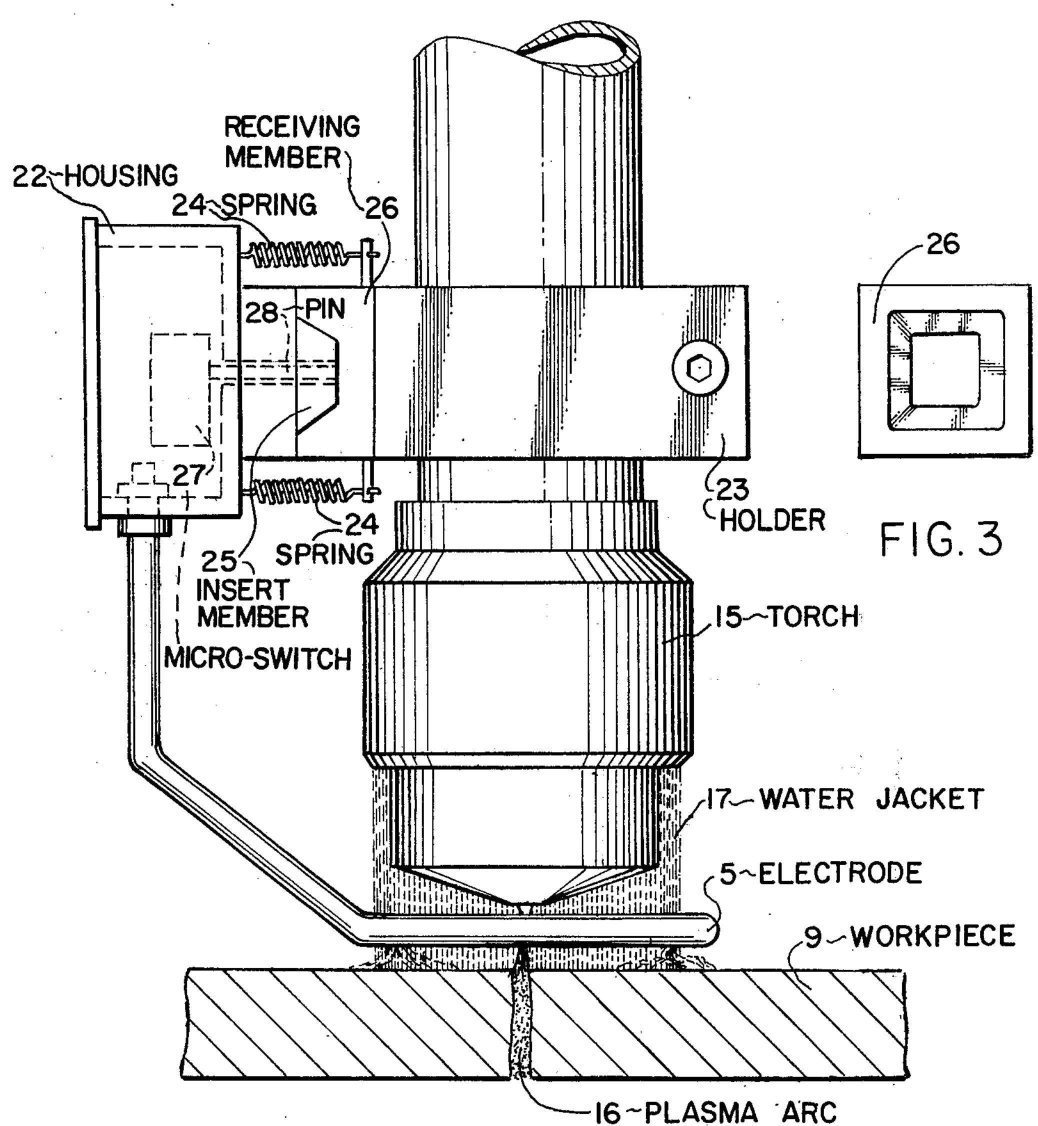
FIG. 2 is a schematic side view of a plasma torch with a control circuit according to the invention.
FIG. 3 shows the detail of a section of the switching-off arrangement according to FIG. 2.

FIG. 2 shows a control circuit according to the invention on a plasma cutting device with a plasma cutting torch 15 whereby the plasma arc 16 is surrounded on all sides by a concentric "water jacket" 17. Electrode 5 which encircles water jacket 17 is mechanically stable connected with a housing 22 and inserted there in insulated condition. Housing 22, furthermore, contains the oscillator circuit as well as the known connected frequency evaluating devices and the components of the resonant circuit according to FIG. 1, which are not shown.

Housing 22 is pressed against a holder 23 by means of springs 24. Housing 22, furthermore, contains a member in the form of a truncated pyramid 25 which fits exactly in a corresponding oppositely shaped receiving member 26 of holder 23. As long as both members are fitted exactly into each other by springs 24, a microswitch 27 incorporated in housing 22 is activated. Pin 28 serves this purpose. As soon as electrode 5, however, experiences a deviation from its normal position as a result of a mechanical effect from the outside, housing 22 shifts or it pivots, depending on the direction from which the change in movement of electrode 5 took place.

As a result, the natural position of members 25 and 26 at housing 22 and at holder 23 is changed in such a way that pin 28 can move in the direction of holder 23 and release microswitch 27. Fractions of a millimeter are sufficient in this case if an appropriately sensitive microswitch 27 is used.

Microswitch 27 introduces in turn in a known way the warning signals or causes the torch drive to stop or move away.

Instead of break-down diode 7 in the control circuit according to FIG. 1, a voltage regulator can of course also be used, which maintains a certain voltage at the connecting point between electrode 5 and condensor 8 and which is provided with a current-limiting circuit which reduces during a short circuit between 5 and 9 the voltage at point 5/8 to zero without damaging the voltage regulator.

Condensor 8 has the function of coupling breakdown diode 7 or the voltage regulator towards zero, alternating current-like, and to keep direct current away. Condensor 8 has the function of keeping the positive auxiliary voltage away from the input of oscillator 10.

The capacitances of the two condensors 1 and 8 are very great compared with the characteristic resonant circuit capacitance which is formed in the present circuit according to FIG. 1 only from the capacitance of capacitance diode 3.

It is of course also possible to connect additional condensors parallel to capacitance diode 3 as a result of which the frequency mistuning influence of 3 is correspondingly reduced so that the frequency count cannot reach the same value when touching takes place between electrode 5 and workpiece 9 than with capacitance diode 3 alone.

An extremely simple measuring circuit is provided according to the invention consisting of few components, which is not sensitive to interference capacitances, which permits a mechanical stress on electrode 5 without significant damage and which is, in addition, extremely reliable and works at constant frequency. The operating reliability, especially for plasma welding equipment, is accomplished outstandingly by the concentric arrangement of electrode 5 around the plasma arc and optionally around a water jacket.

What is claimed is:

1. In a control circuit for measuring the distance between a workpiece and a sensing element which is formed as inductance and is part of a resonant circuit as a frequency-determining element whereby the frequency variations of the resonant circuit for producing voltage and/or current changes which are proportional to a distance are connected to a measuring circuit, the improvement being said resonant circuit having at least two partial inductances, one of said partial inductances being represented by said sensing element and the other of said partial inductances being a stationary resonant circuit coil arranged at a distance from said sensing element and in immediate influence sphere of the workpiece, in combination therewith, wherein sensing element is part of a cutting torch and said workpiece is metallic, and said sensing element being arranged concentrically around the cutting torch beam, said sensing element being connected to a switching-off device connected to torch control means for inactivating the cutting action of the cutting torch, a capacitance diode being connected to said sensing element, an auxiliary voltage source being connected to said sensing element and said capacitance diode for adjusting a capacitance value to be determined, and said workpiece being connected to the axuiliary voltage source in such a way that when said sensing element and workpiece touch each other the voltage at the capacitance diode and its capacitance value is variable.

2. Device according to claim 1, characterized in that said coil inductance is greater than said sensing element inductance by a factor of at least 30.

3. Device according to claim 2, characterized in that said coil inductance is greater than said sensing element inductance by a factor of about 50.

4. Device according to claim 1, characterized in that said sensing element is movably mounted and is connected with a switch in such a way that said switch can be activated when said sensing element moves and that said switch in turn is connected electrically with said switching-off device in order to activate it.

5. Device according to claim 1, characterized in that said sensing element is surrounded by an insulating jacket.

6. Device according to claim 1, characterized in that said sensing element has a conductor ring which runs approximately 360° concentrically bent around said welding torch beam.

* * * * *

UNITED STATES PATENT AND TRADEMARK OFFICE

CERTIFICATE OF CORRECTION

PATENT NO. : 4,333,052

DATED : June 1, 1982

INVENTOR(S) : Karl-Heinz Schmall

It is certified that error appears in the above-identified patent and that said Letters Patent is hereby corrected as shown below:

On the title page, line [73], the assignee should be -- Precitec Gesellschaft fuer Praezisionstechnik und Elektronik mbH & Co. --.

Signed and Sealed this

*Twenty-third* Day of *November 1982*

[SEAL]

*Attest:*

GERALD J. MOSSINGHOFF

*Attesting Officer* *Commissioner of Patents and Trademarks*